(12) United States Patent
Samid

(10) Patent No.: US 12,231,534 B2
(45) Date of Patent: Feb. 18, 2025

(54) CRYPTOGRAPHIC INNOCENCE BOX

(71) Applicant: Gideon Samid, Rockville, MD (US)

(72) Inventor: Gideon Samid, Rockville, MD (US)

( * ) Notice: Subject to any disclaimer, the term of this patent is extended or adjusted under 35 U.S.C. 154(b) by 0 days.

(21) Appl. No.: 17/706,530

(22) Filed: Mar. 28, 2022

(65) Prior Publication Data

US 2023/0308257 A1 Sep. 28, 2023

(51) Int. Cl.
*H04L 9/08* (2006.01)
*H04L 9/06* (2006.01)

(52) U.S. Cl.
CPC .......... *H04L 9/0618* (2013.01); *H04L 9/0662* (2013.01); *H04L 9/0825* (2013.01); *H04L 9/0897* (2013.01)

(58) Field of Classification Search
CPC ... H04L 9/0618; H04L 9/0662; H04L 9/0825; H04L 9/0897; H04L 2209/08; H04L 2209/16; H04L 2209/42; H04L 9/14
See application file for complete search history.

(56) References Cited

U.S. PATENT DOCUMENTS

| | | | | |
|---|---|---|---|---|
| 8,613,387 B1* | 12/2013 | Billett | ............... | G06F 21/57 |
| | | | | 235/379 |
| 10,262,322 B2* | 4/2019 | Lee | ............... | G06V 40/13 |
| 2004/0091114 A1* | 5/2004 | Carter | ............... | G06F 21/606 |
| | | | | 380/259 |
| 2005/0162282 A1* | 7/2005 | Dresti | ............... | H04N 21/42221 |
| | | | | 340/12.3 |
| 2008/0065844 A1* | 3/2008 | Heller | ............... | G06F 11/1458 |
| | | | | 711/162 |
| 2011/0081015 A1* | 4/2011 | Parker | ............... | G06F 21/6236 |
| | | | | 380/28 |
| 2017/0250796 A1* | 8/2017 | Samid | ............... | H04L 9/0838 |
| 2018/0218141 A1* | 8/2018 | Biesecker | ............... | G06F 21/575 |
| 2020/0279047 A1* | 9/2020 | Haager | ............... | H04L 63/0428 |
| 2021/0174953 A1* | 6/2021 | McKeown | ............... | G16H 40/63 |
| 2021/0350017 A1* | 11/2021 | Gordon | ............... | G06F 21/602 |
| 2022/0075904 A1* | 3/2022 | Horikawa | ............... | G06F 21/72 |
| 2022/0121781 A1* | 4/2022 | Klapman | ............... | G06F 3/0643 |
| 2022/0303127 A1* | 9/2022 | Khoury | ............... | H04L 67/55 |
| 2023/0308482 A1* | 9/2023 | Warmenhoven | ...... | H04L 9/0822 |

* cited by examiner

*Primary Examiner* — Carl G Colin
*Assistant Examiner* — Hany S. Gadalla

(57) ABSTRACT

Using composite cipher technology building a single ciphertext C that will decrypt to the true (hot) plaintext $P_h$ using key $K_h$, and to plaintext $Pj \ne P_h$ using key $Kj \ne K_h$, thereby a single file C will carry any number of distinct plausible messages where an attacker cannot sort them out, but the intended reader who knows which key is $K_h$ will decrypt the ciphertext C to $P_h$. Encryption and Decryption happens in a stand-alone, not Internet connected box—the Innocence Box.

5 Claims, 4 Drawing Sheets

Innocence Box: Configuration

The Innocence Box: Components

Innocence Box: Configuration

The Box Man-Machine Interface

Here is a message for the human operator and request to choose between two specified options option 1 option 2

CRYPTOGRAPHIC INNOCENCE BOX

BRIEF SUMMARY OF THE INVENTION

This invention applies the technology of composite cipher described in the continued application and in U.S. Pat. No. 10,541,808, 10,728,028, 11,290,253 where n plaintexts $P_1$, $P_2$, ... $P_n$ with matching k cryptographic keys $K_1$, $K_2$, ... $K_n$ will be encrypted into a composite ciphertext CC; and where CC will be decrypted to plaintext $P_i$ using a cryptographic key $K_i$, for i=1,2, ... n, and to a different plaintext $P_j$, using a different key $K_j$, j=1,2, ... n This composite cipher is preprogrammed into a stand-alone box, called 'The Innocence Box' where the plaintexts, the keys and the ciphertexts are communicated to via USB ports or equivalent. The box has a simple human-machine conversation capability, and otherwise it connects only through the USB sticks. Two parties sharing the keys can thereby send each other a true message T identified by being encrypted and decrypted with its corresponding key, $K_T$, and any number of 'fake' or say decoy messages $D_1$, $D_2$, ... $D_{n-1}$. The intended recipient will identify T, but any adversary, even an omnipotent adversary cryptanalyzing the composite ciphertext will regard the n plaintexts, if discovered, as equally likely to be the true one.

CROSS REFERENCE TO RELATED APPLICATIONS

Provisional Application No. 62/336,477 filed on May 13, 2016, Provisional Application No. 62/339,921 filed on May 22, 2016, Provisional Application No. 62/374,804 filed on Aug. 13, 2016. The above applications were claimed in U.S. patent application Ser. No. 15/594,637, which is continued in parts by application Ser. No. 16/792,093, which in turn is continued by the application herein.

Further claims: Provisional Applications #62/805,369 filed on Feb. 14, 2019; Provisional Application No. 62/813,281 filed on Mar. 4, 2019; Provisional Application No. 62/813,281 filed 4 Mar. 2019; Provisional Application No. 62/850,720, filed May 21, 2019; Provisional Application No. 62/857,898 filed Jun. 6, 2019; Provisional Application #62/900,567 filed Sep. 15, 2019, Provisional Application No. 62/926,560 filed Oct. 27, 2019; Provisional Application No. 62/931,807 filed Nov. 7, 2019; Provisional Application 62/963,855 filed Jan. 21, 2020. The above applications were claimed in U.S. patent application Ser. No. 16/792,093 which was continued in parts by application Ser. No. 17/163,553 which is continued by this application.

Further claims: Provisional Application 63/034,401 filed Jun. 4, 2020, Provisional Application 63/051,652 filed Jul. 14, 2020, Provisional Application 63/005,062 filed Apr. 3, 2020; Provisional Application 63/140,006 filed Jan. 21, 2021. The above applications were claimed in U.S. patent application Ser. No. 17/163,553 which is continued by this application.

Further Claims: Provisional Application #63/276,662 filed on 2021 Nov. 8; Provisional Application #63/292,954 filed on 2021 Dec. 22; Provisional Application #63/306,501 filed on 2022 Feb. 4

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISK APPENDIX

Not Applicable.

BACKGROUND OF THE INVENTION

With the looming threat of quantum computing over the full range of the prevailing ciphers, it is important to develop a safe cryptographic apparatus that can withstand an omnipotent cryptanalyst; such apparatus will also have to be secure against hacking and silent malware, and even against coercion. This application offers such an apparatus.

Overview: Constructing a stand-alone computing device encrypting and decrypting composite ciphertexts, dubbed "The Crypto Innocence Box", or "The Box". The Box is off-line, and will assemble a composite ciphertext CC comprising an arbitrary number, n, of plaintexts: $P_1$, $P_2$, ... $P_n$, encrypted each with their corresponding key: $K_1$, $K_2$, ... $K_n$. The composite cipher travels through insecure channels to its recipient using a similar Box with the same n keys to decrypt the composite cipher CC to its n plaintexts $P_1$, $P_2$, ... $P_n$. The recipient may have fewer keys and decrypt CC to fewer plaintexts. The parties agree beforehand that message $P_h$ encrypted and decrypted with $K_h$ is the true message sent by the transmitter to the recipient, while the other (n−1) messages are regarded as "decoy"—false. An omnipotent cryptanalyst will identify the n keys and their corresponding plaintexts, but will be blind as to which of the n options is the right one. To the extent that the n $P_1$, $P_2$, ... $P_n$ messages are all plausible, so is the cryptanalyst confusion as to which one is true. Under pressure, the parties will jointly point to a non-incriminating (decoy) message as the true one; their claim cannot be mathematically disproven. Say then, the parties may put up a robust claim of innocene in the face of coercion. The combination of off-line processing, and composite ciphertext building turns The Innocence Box into a robust privacy tool.

The upper part shows the external features of the innocence box. They are the on/off button, the man-machine interface, the ciphertext port C, the randomness port R, the plaintext port P, and cryptographic key port, K. The lower part shows the internal functions: a computing processor (element), PROC, an optional randomness generator RAND, internal memory MEM, and a source of battery power POW.

Figure 1:
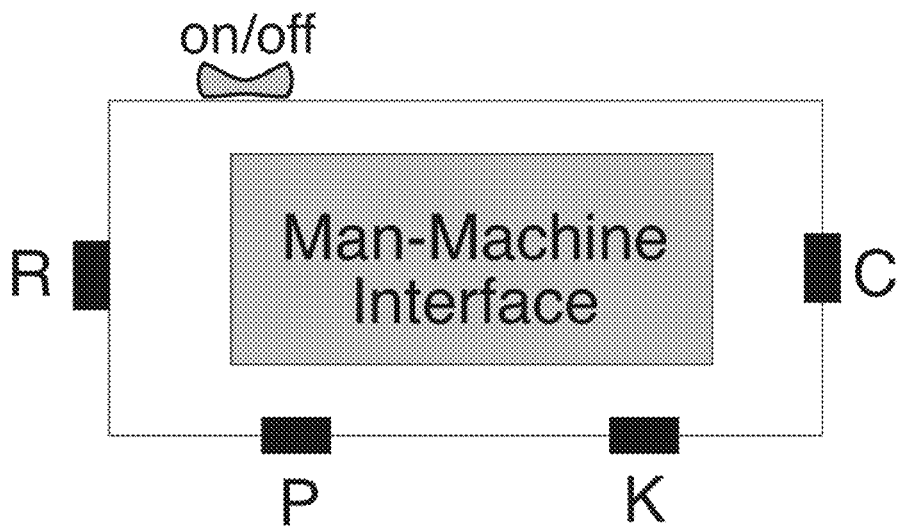
FIG. 1 Innocence Box: Components.
Figure 1:
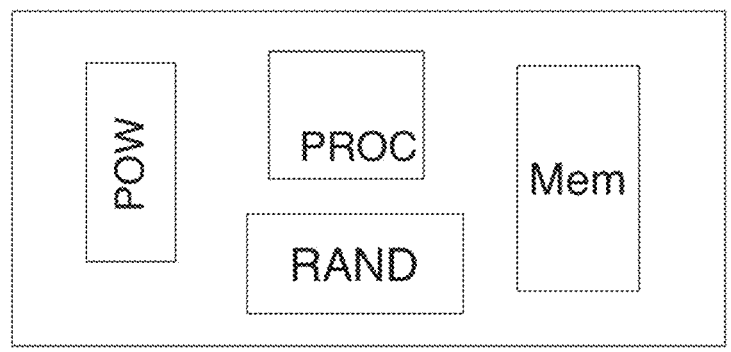
Figure 2:
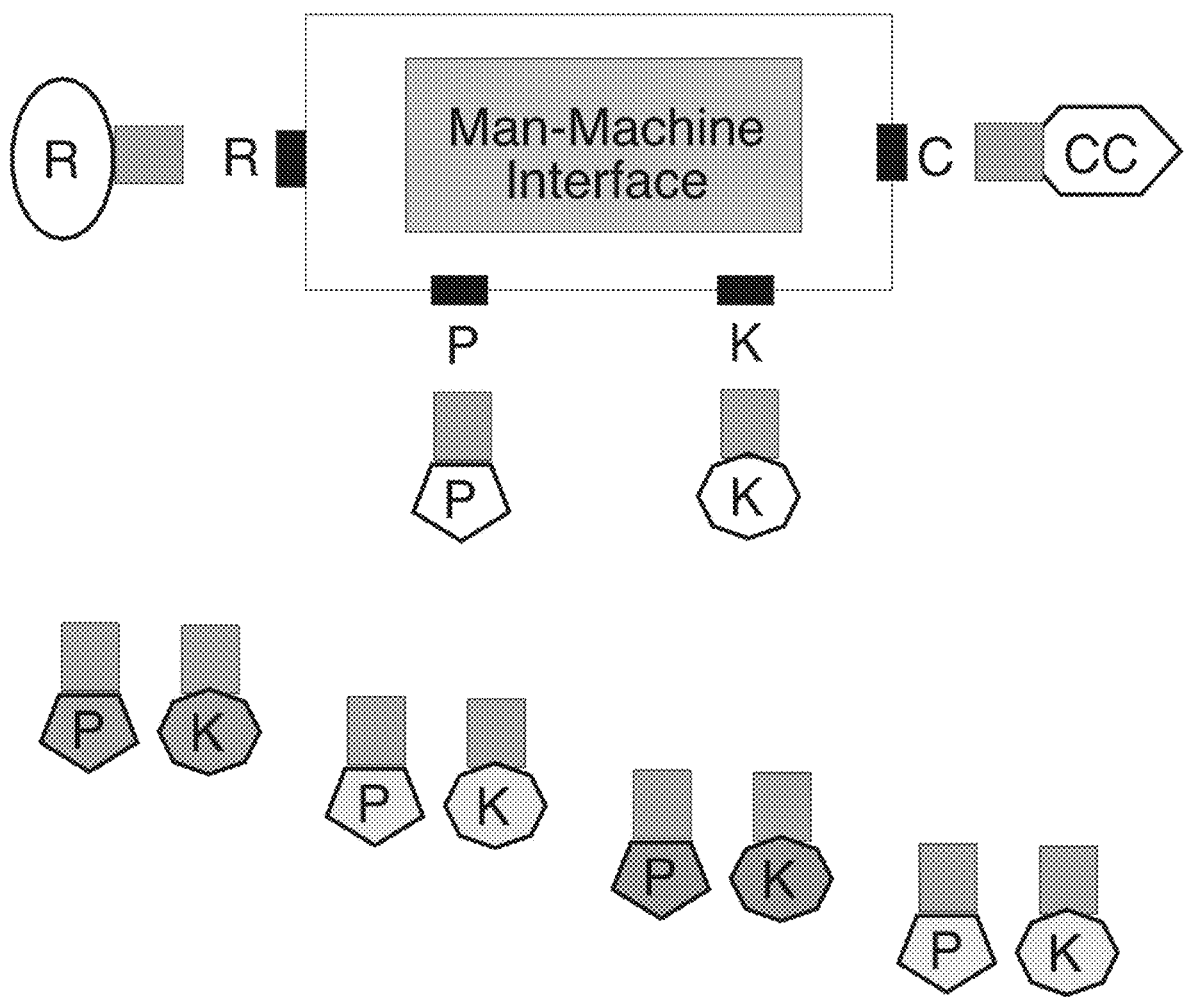

FIG. 2: Memory Devices Connecting to the Box

The figure shows four types of memory devices. They can be flash drive or other memory technology. They are connected via a USB port, a C-type port or any other data exchange port. There are four types: plaintext, cryptographic key, composite ciphertext, and randomness sources, marked P, K, CC, and R respectively. The bottom part shows four pairs of plaintext and corresponding cryptographic keys. The pairs are color coded to prevent confusion. Their heads are of different shape whether K or P, again, to prevent confusion.

Figure 3:
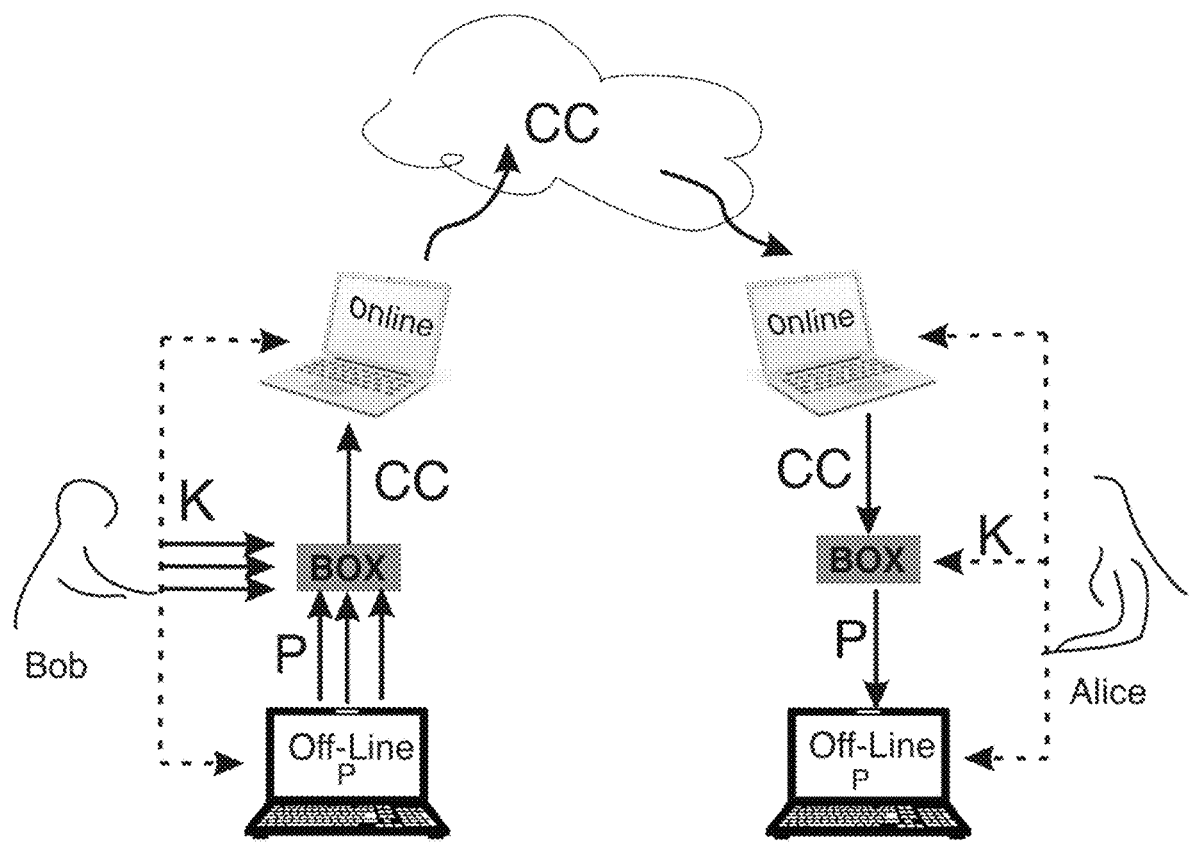

FIG. 3: Innocence Box: Configuration

This figure shows the dynamics of information flow within the 'innocence' configuration. The figure shows Bob communicating a secret P to Alice. Bob first generates secret P on his off-line computer (left bottom). Since the computer is off line it is not vulnerable to remotely inserted malware. Bob uses the offline computer to generate the "hot" plaintext $P_h$ and the decoy plaintext $P_d$ (one or severals). Each plaintext $P_i$ is matched with a cryptographic key, $K_i$. There are n pairs of plaintext-keys. The keys are available to Bob (and previously shared with Alice). Bob adds the (P, K) pairs to the innocence box, pair after pair, and then activates the box to combine the n plaintexts into a composite ciphertext CC. The ciphertext is transported through flash drives or equivalent to an online computer from where CC is sent via the Internet to Alice's online computer. Alice retrieves CC from her online computer (downloads it to a flash drive), then Alice reads CC into her innocence box and enters the hot key for the hot plaintext into the box. The box then is activated and extract the hot P from CC. P is downloaded to a flash drive and read in Alice's offline computer. The net operation is that the secret P (the hot P) was transported from Bob's offline computer to Alice's offline computer. The transportation passed through the public information highway, but the passage was secure.

Figure 4:
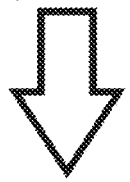
Figure 4:
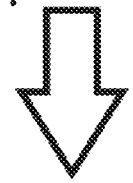
Figure 4:
Figure 4:

FIG. 4: The Box Man Machine Interface

This figure shows a rectangle representing the screen through which the Innocence box communicates to its human operator. The screen features a message that explains what comes next and specifies two options, 1 and 2 for the human operator to choose from. The screen further shows two arrows that associate the two options with two generic buttons that are built into the box and are placed outside the screen. The human operator is invited to choose one of the two.

INTRODUCTION

The backbone of cyberspace is the secure communication between two or more parties which know each other, and which had an opportunity to exchange cryptographic keys off line. This what we call baseline communication is the skeleton for cyberspace, and the foundation for all the rich communication between strangers, remote acquaintances, etc.

If the baseline communication (BLC) comes into question, it shakes the entire cyber edifice. Today there are several threats facing the BLC:

1. hackers and malware 2. cryptanalysis 3. coercion

Coercion refers to a dominant agent coercing a communicator to reveal the cryptographic key used for the communication. In that case it matters not how robust the cryptography, or how secure the secret is from hackers.

Here we set out to designing a solution that will give good answer to all three threats. It is the Innocence Box. The name is derived from the power of this solution to resist coercion with a simple method. A user having a 'hot file,' H, containing a secret to be protected against coercion, will defend themselves by writing an innocent file I, then using a hot key $K_h$ to apply to H an innocent key, and use a different key, $K_i$ to apply to I, and together generate a composite ciphertext CC. CC is in a so-called superposition ciphertext. If CC is decrypted with $K_h$ to yields the hot message H. If CC is decrypted using $K_i$ it yields the innocent message I. The continued application specifies several ciphers that qualify as composite ciphers, namely ciphers that encrypt and decrypt composite ciphertexts.

Therefore, when a dominant agent capturing CC is approaching the users with a demand to reveal the key that would decrypt CC, the users will pull out the 'innocent key' $K_i$ and use it to decrypt CC to I, claiming that the innocent message I was the one communicated. Even if the dominant agent cryptanalyzes CC and finds the hot key $K_h$ and the hot message H, then it does not indicate that H was the real message, and I is a decoy, versus the possibility that I is the real message and H is the decoy. Mathematically there is no distinction between H and I. That is why the box is called the Innocence box.

The box itself has no security. It has a hard-wired program that feeds on data it reads from connected flash drives. It writes its outputs on attached flash drives, and it converses through a man-machine interface with its human operator. Plaintexts are generated and read on computing devices which are stand alone, with no Internet connection, and ciphertexts are incorporated into normal connected computing machines. The system includes then 1 The Innocence Box 2 Flash Drives 3 Stand alone computer 4. Networked computer Two parties, say Alice and Bob, share some keys, before they move into online communication mode. Both operate a copy of the Innocence box. It has no secrecy in it. Both operate an Innocence Protocol and thereby establish secure communication in cyber space. This solution can be extended to any arbitrary number of communication partners all sharing some cryptographic keys written into flash drives, or alike. Also the number of innocent plaintexts may extended to any desired number, n.

The Innocence Procedure

We describe ahead the use of the Innocence box in the following modes:

1. self use 2. two parties use 3. multi party use

The general procedure is the same: a secret writer prepares a digital version of their secret using a secure computing device, preferably one that is not online. This is regarded as the hot secret, H. The secret writer will then prepare a so called 'innocent version' I, which is different from H: I≠H, and is designed to be presented to a dominating agent compelling the secret writer to disclose the contents of the transmitted message. Both H and I are transported to flash drives, then are attached to the innocent box each in conjunction with two different corresponding cryptographic keys $K_h$, and $K_I$. The Innocent Box is activated and then generates a composite ciphertext CC. CC is released into hostile territory through which it is received by the intended reader. This reader will use their copies of $K_h$ and $K_I$, and apply them to CC to extract H and I:H=D(CC,$K_h$), I=D(CC, $K_I$). D—represents the decryption function.

The Box will copy I and H to an attached flash drive to be used on any computing device. When the operation is done the Innocence box erases all data so it contains no secret, no clue as to the secret it processed.

Protecting of H after the Innocence operation is the responsibility of the secret writer and the secret reader.

If the secret writer and/or the intended reader are being compelled by a dominant agent to disclose the contents of CC, they both present I and Kr.

The operational details depends on the use, but they share the basic sequence.

Construction of the Innocence Box

The various designs share the following:

1. No secrecy inside the box.
2. flash drives outlets for (i) plaintexts (s) (ii) keys, (iii) ciphertext, (iv) operational randomness.
3. Man Machine interface.

4. Batteries
5. Computing Elements
6. Memory devices.

The Box Internals

Inside the box we find the computing element, the memory devices, battery, and optionally a randomness source.

The battery powers up the box operation. It may be a removable battery or it may be a chargeable battery where a normal USB will recharge it. Note: for convenience we use the term USB stick throughout the specifications. These sticks may also be a C type or any other construction by which an external memory is fitted into the Innocence Box and data is being read and written.

The memory devices inside the Box will be volatile memory. They will be powered up by the battery when the innocence box is in operation, and all the data on them will be erased when the box is powered down. Thereby the box itself will remain plain, not keeping any information that may be used to compromise the security of what it processed. The size of the memory will be designed to fit the desired number, n of composite plaintexts to be used with the box, given consideration to the bit size of the various plaintexts. It is noteworthy that a large plaintext may be divided to smaller parts and pass through the innocence box in several rounds.

All memory that is read in by the box, and all memory that is generated by the box will fit into the box internal volatile memory.

The computing element will be set up to do nothing else except to carry out the algorithm specified by the cipher and the associated dialogue with the box human operator, as well as assorted administrative tasks. In a simple embodiment one box will be programmed to handle one cipher, e.g. BitFlip. (as identified in the continued application). In a more compound embodiment two or more ciphers capable of generating composite ciphers will be housed in the computing device and the user will be able to choose from the man-machine interface which cipher to use each time. The computing element will be powered up by the battery, will be managing the data entry ports and the data output ports, will be storing data in the volatile memory, will be feeding randomness externally or generating randomness algorithmically. The pre-programmed cipher will only hold the programmed protocol, no information, and especially no secret information will be stored.

The Box Externals

They are:
1. on-off button,
2. data entry ports,
3. data output ports,
4. man-machine interface.

The on-off button is critical, when the innocence box is powered up it is ready to accept input from the ports, compute the entered data into the output data, and thereby fulfill its task. When done the on-off button has to be switched off. This action erases all the data that was kept in the volatile memory in the box. The off action makes the box forget any data that it was exposed to, so there is no security risk from exposing the box.

Data Entry Ports are Four Categories:
1. plaintexts,
2. composite ciphertext,
3. keys,
4. randomness source.

There is one plaintext port, one key port, one ciphertext port, and one randomness port.

There are two output ports: 1. ciphertext port—where the encryption generated composite ciphertext is output to, and 2. the plaintext output port where the decryption generated plaintext is output to.

Man Machine Interface

There are several embodiments that would support the required dialogue between the innocence box and its human operator.

The simplest one features a screen used for messages from the box to its human operator, and on-screen pointers to generic physical buttons. The simplest setup will feature two buttons one marked 'yes' and one marked 'no'. The operation of the box is so regimented that two buttons will suffice.

The Innocence Box Operation

The Innocence box operation starts with powering it up with the on/off button. When powered up, the volatile memories come alive, ready to absorb data. We describe ahead an innocence box programmed with one particular composite ciphertext cipher, (e.g. BitFlip).

Upon powering, the box displays a message: "Choose Operation". Below, on the screen it offers two options: 1. encryption, 2, decryption. Each option is pointed to one of the physical selection buttons. The human operator chooses. (note: in advanced setting described later, the user will be able to choose to modify setting for randomness intake).

We discuss first the case that 'encryption' was selected by the human operator.

Encryption Operation

Upon selecting 'encryption' the box displays a message: "Enter the plaintext stick into the plaintext port, and enter the corresponding cryptographic key into the key port" (this is the PK message).

The box then waits for the human operator to place a stick loaded with the plaintext to be encrypted, ($P_1$) to the plaintext port $P_{port}$, and place the key stick, $K_1$ into the key port, $K_{port}$.

In some embodiments the $P_1$ stick and the $K_1$ stick will be in matching colors to insure that a plaintext is matched with its intended key. The sticks are nominally flash drives, but they can be embodied in any other way to store bits in order and having them been read by the computing element in the box.

When the two sticks, $P_1$, and $K_1$ are placed in their respective ports, the competing element in the box detects them and reads their contents into the box's volatile memory. In the event that the total memory of the data in the fitted sticks is larger than the available space in the volatile memory in the box, the box displays a message: "Internal Memory insufficient, press marked button to see guide, or other button to remove the sticks". If the guide button is pressed, then a message appears on the screen or a link for a URL is given. The explanation says that the plaintext may be curtailed, or if this is not the first pair of plaintext and key then, encryption can proceed without the overflowing pair of sticks.

At the bottom of the above message shows up the command message: "Remove the P stick and the K stick".

The box waits for the operator to remove the two sticks. When done and detected by the box, the box displays the following message: "Enter new pair of P and K sticks, or power off the Box." If this memory insufficiency is detected after at least one plaintext and matching key were entered then the machine offers the human operator the option to encrypt the plaintexts entered so far.

If the human operator powers off the box, the procedure terminates. If the human operator places a new pair of P and K sticks, then if again there is not sufficient memory then the above procedure repeats. If there is sufficient memory in the box, then it copies the content of the P stick and the contents of the K sticks. Without confusion we will again designate them as $P_1$ and $K_1$.

When the contents of $P_1$ and $K_1$ has been fully and faithfully copied into the box internal volatile memory, it displays the following message: "Do you wish to encrypt, or add another P-K pair?" and the screen points to the two selection buttons with messages: "ready to encrypt", "adding P-K pairs".

We now describe the procedure for both options.

Ready to Encrypt Procedure

In this case the box will use the copied K to encrypt P into its corresponding ciphertext. Since there is only one plaintext, then the ciphertext is not composite, but we will regard it nominally as composite with one component, and still call it CC. CC is generated either in the internal memory of the box and then copied into the CC stick, or generated directly into the CC stick. In both cases, before the encryption procedure commences the Box displays a message for the operator: "Fit a ciphertext stick, C-stick in the ciphertext port". Then the Box waits for the human operator to comply.

If after a preset time the human operator does not comply, then the Box displays a warning: "Please press any button to have more time to put the C stick in the $C_{port}$." With it a running clock is being displayed for some 60 seconds or more. If the operator presses a button then the Box waits another set time before repeating the above. If no button is pressed the box turns itself off and loses all the internal memory.

If the human operator complies and fits a C-stick into the $C_{port}$ then the box will copy into the C-stick the generated composite ciphertext. When done the box will display a message; "Encryption Complete, Please remove all memory sticks from this Box". Following this message the box may be fitted with a sound alarm, in case the sicks are not removed, or the box simply turns itself off.

The human operator now has the encrypted version of $P_i(CI)$ in the C stick. The C stick will now be removed and fitted into any computer for the purpose of sending it over insecure channels to a recipient who is equipped with the corresponding key $K_1$.

Add Another P-K Procedure

In this case the box will display a message saying: "Remove the P and K sticks from this box, and fit the next pair of P and P sticks".

The machine will then wait for the human operator to remove the current P-K pair of sticks and fit another pair. This will be $P_2$ and $K_2$. The box will read the content of the two sticks.

The box will compare $K_2$ to $K_1$. If $K_2=K_1$ then the box will display a message: "The current key is inconsistent with the previous keys, push 'explain' for an explanation, or push 'no explanation needed".

The explanation will state that all keys need to be sufficiently different for the composite cipher to work.

The box will then ask the operator to press "continue". Then the box will state: "Wish to encrypt or add another pair?". From then on, the process will repeat as above. After i plaintexts and matching keys have been entered, the generated ciphertext will be a composite of the i plaintexts in encrypted form.

In the case where the composite cipher is BitFlip then the key for any letter for any plaintext cannot be the same as the key for any letter for another plaintext. The computing element in the box will check for this condition and will alert the human operator if this condition has been violated.

Randomness Operation

Some composite ciphers use unilateral randomness for their operation. Unilateral randomness is not pre-shared with the recipient (the way the cryptographic key is shared). It is used by the encryption process to generate the composite ciphertext.

There are various ways to generate the required unilateral randomness:

1. internal algorithmic randomness
2. external randomness
3. internal non-algorithmic randomness Internal Algorithmic Randomness Any of the common pseudo-randomness algorithms may be built into the Innocence box and generate the required stream of randomness.

In the simplest way the randomness generating algorithm will be a fixed setting.

In a more advanced embodiment, the randomness generating algorithm will be seed-activated. The seed will be determined unilaterally by the transmitter.

The method to determine the seed will be through accelerated adjustment, which is a common method to set up a clock using only two keys "up" and "down". In this setting the Box will have an additional operation for the user to choose from: 'seed setting'. (not just "encryption" and "decryption). In this setting the display will start with zero, or with some arbitrary number N shown on the screen. The user will press the physical button marked on the screen as "Up" or press the one marked as "Down". And then the value of the seed shown on the screen will go up or down as indicated. The longer the human operator (the user) keeps his thumb on a button (up or down) the more accelerated the change of the value of the seed in the direction indicated. The operator will be able to switch the pressing from up and down and back so as to get the screen to show the exact number the operator wishes to show. When this happens the human operator presses both buttons together and the shown number is registered as the seed for the randomness generated algorithm (e.g. a shift register cipher).

An even more advanced embodiment will be based on the randomness filter, as described in the article "Randomness as Absence of Symmetry" G. Samid THE 17TH INTERNATIONAL CONFERENCE ON INFORMATION & KNOWLEDGE ENGINEERING (IKE'18: Jul. 30-Aug. 2, 2018, LAS VEGAS, USA). Accordingly a raw randomness (stream of bits) is input into a filter function that evaluates the raw randomness one standard size string at a time. Each such string is evaluated as to its level of symmetry that it exhibits, the greater the symmetry the lower the randomness. Each string that does not exceed a preset threshold is discarded. The output stream of this operation includes only strings that pass above the threshold test.

This filter mechanism can be applied onto the output generated by the randomness generating algorithm. The threshold applied will be determined by the human operator also using two keys for "up" and "down" adjustment of value between say 10% random to 90% random.

External Randomness

The Innocence box will be reading the necessary randomness from a randomness stick fitted into its randomness port, $R_{port}$. Once the randomness on the stick is exhausted then the box alerts the human operator and stops its work, waiting for a new supply of randomness.

The external source can be viewed as raw randomness and processed with a filter as described for the algorithmic randomness.

Internal Non-Algorithmic Randomness

There are today technologies to generate quantum grade flow of randomness. These technologies can be fitted into the box and used by its computing element. One such technology is the "Rock of Randomness" (as documented in U.S. Pat. No. 10,467,522). The Rock will be installed in the box and used as a source of randomness. Each box will have its own rock, no need for rock sharing.

Generalization

The above procedure will allow for t pair or P-K sticks to be pair by pair added to the Innocence box. After the P plaintexts $P_1, P_2, \ldots P_n$ are all in and the t respective keys $K_1, K_2, \ldots K_n$ are in too, then the composite cipher will build the corresponding composite cipher CC.

AI Based Decoy Preparation

Given a true plaintext, $P_h$, the transmitter can fashion any (n−1) decoy plaintexts and fit each of them with a respective key. The plausibility of the decoy plaintexts does play a role. The transmitter can readily change some details, some locations, timing, intent, people and generate different stories (decoys). But such may be hard work. Modern artificial intelligence, AI, technology can accomplish that objective. Given the true plaintext, $P_h$, AI software can build any number of decoys off that true one, while maintaining plausibility.

Decryption Operation

Upon the human operator selecting 'decryption' the box will display the message: "Place the C-Stick in the $C_{port}$, and place a selected key stick in the $K_{port}$". The human operator will place the C stick containing the composite cipher CC in the $C_{port}$ then select a K stick containing key, $K_i$ that was used to encrypt $P_i$, where i=1,2, ... n where n is the number of plaintexts that were used to build the composite ciphertext.

When the box detects the C stick and the K stick it copies the data in the two sticks into its internal memory and activates the decryption algorithm with $K_i$ over CC. Thereby the box generates the corresponding plaintext $P_i$. When done the box displays a message "Please place an empty stick in the $P_{port}$".

When the human operator complies, the box first checks that the placed stick has no data onto it. If it does it says so in a message and asks the human operator to fix this problem (fit an empty memory stick).

When an empty stick is being put into the $P_{port}$, then the box checks if the stick has enough memory to contain the plaintext $P_i$. If not then a message to that effect is being displayed asking the human operator to fit a larger P stick. Once there is enough memory in the fitted P stick, then the box copies $P_i$ to the P stick. When done the box displays a message: "Plaintext ready in the P stick. Please remove the P stick from the box".

The box waits for the human operator to remove the P stick. The above described shut off procedure is activated if the human operator does not respond.

When the human operator removes the P stick with $P_i$ in it, then the box displays a message: "Are you done, or ready for another decryption?" The human operator replies by selecting the proper button next to the screen. If the answer is 'done' the box displays a message: "Please remove all the sticks from the box". The box then waits for this to happen, and uses perhaps a sound alarm if the human operator is not responsive. Once the human operator removes all the sticks from the box, the box turns itself off.

If the human operator replies "ready for another decryption" (by pressing the pointed to button) then the box displays the message "put another key in the $K_{port}$". When done, the box repeats the above decryption procedure.

This repeats as many times as the human operator wishes. If the human operator that performs the decryption is in possession of all the t keys $K_1, K_2, \ldots K_n$, they can extract from CC all the plaintexts. If they have one or some keys they can extract only the corresponding plaintexts.

Use Cases

The Box can be used by a single operator, It can be used half way, namely only for encryption, or only for decryption while the opposite procedure is carried out in a general purpose computer.

We focus here on maximum security use case.

Two Parties Maximum Security Use Case

Two parties agree on one hot key that corresponds to the 'hot' (true relevant, secure) message sent from to the other, while all the other (n−1) messages are decoy messages. The two parties have all the n keys. They set up a configuration as follows:

1. Transmitter's isolated plaintext preparing computer
2. Transmitter's Innocence box
3. Transmitter's connected computer
4. Recipient's connected computer
5. Recipient's Innocence box
6. Recipient's isolated plaintext reading computer.

The transmitter prepares the secret plaintext (the hot one), $P_h$ in the transmitter's isolated plaintext preparing computer. In that computer the transmitter copies $P_h$ to a plaintext stick. The transmitter prepares the other (n−1) plaintexts (the decoy ones) in same isolated computer or in any other computer. Then the transmitter uses the box per its procedure as described above, and takes the resultant CC copied into the C stick to the transmitter's connected computer, from where the transmitter is using the Internet to pass CC to the recipient in the recipient connected computer. From the connected computer the recipient copies CC into a C stick, and then uses the recipient box with the proper key, $K_h$ to retrieve $P_h$ into a P stick. This P stick is then read by the recipient's isolated computer where the recipient reads the content of the hot plaintext, $P_h$.

Multi Party Maximum Security Use Case

This mode is similar to the binary mode except that the keys are shared by all participants. A set for 10 communicators will include 10 boxes, and 10 copies of the used keys.

BitFlip as Composite Cipher

BitFlip as defined in the continued application, as well as in U.S. Pat. Nos. 10,541,808, and 10,728,028, call for a key for each plaintext $P_1, P_2, \ldots P_n$, namely $K_1, K_2, \ldots K_n$, to be comprised of $a_i$ letters, where each $P_i$ (i=1,2, ... n) is defined over $a_i$ letters; and all the A letters where:

$$A=a_1+a_2+a_i \ldots a_n$$

will be each represented by a secret key of same size of l randomized bits each. The smaller A, and the larger l the greater security of the system.

Box Production

In the simplest embodiment a box will feature one cipher only, and with a fixed level of security. There will be different security grades, each coming with a different number n of keys. For example the following:

A two party grey set: includes a box with built in algorithmic randomness (seed adjusted), and 2 sets of 4 color coded key sticks. where each of the same color key stick contains the same information (same key). Two parties, Alice and Bob, take home one box each and one set of the 4 color coded keys. In this case Alice and Bob can create a ciphertext composed of up to 4 known plaintexts to be shared by both. The security parameters of the cipher will be mild. Note that the transmitter may use unshared keys in conjunction of any plaintext, without presharing with the recipient. The composite ciphertext will carry all the plaintexts used by the transmitter (with keys that are consistent with the other keys).

A two party black set: includes a box with built in external randomness feed), and 2 sets of 8 color coded key sticks. where each of the same color key sticks contains the same information (same key). Two parties, Alice and Bob, take home one box each and one set of the 8 color coded keys. In this case Alice and Bob can create a ciphertext composed of up to 8 known plaintexts. The security parameters of the cipher will be moderate.

A two party orange set: includes a box with built in external randomness feed), and 2 sets of 16 color coded key sticks. where each of the same color key stick contains the same information (same key). Two parties, Alice and Bob, take home one box each and one set of the 16 color coded keys. In this case Alice and Bob can create a ciphertext composed of up to 16 known plaintexts. The security parameters of the cipher will be high.

The parties will first check their set of keys by exercising a composite cipher composed of all the allowed keys. If there is any inconsistency between the keys the Box will so notify, for the users to change something in the definitions of the keys.

For example, if the composite cipher is BitFlip, then no key for any letter can be duplicated by another or same letter key for a different plaintext.

Security

Composite ciphers carry a built in equivocation security about them. Even an omnipotent adversary in possession of the composite ciphertext will not be able to determine which is the true plaintext and which are decoys. The box has only computing function for the selected cipher, so it cannot be 'seduced' to serve a hacker. For any adversary less than omnipotent, the discovery of the keys can be expected only after sufficient use of these keys has taken place, and for large keys such 'sufficient use' may be quite a lot of use. In addition, the way BitFlip works, there are likely to be found more keys that can be associated with plausible plaintexts, further inducing confusion for the adversary.

The way the box is set up, not directly connected to the Internet, it admits only the content of the ciphertext to be subject for cryptanalyses and the best that can be achieved by that adversary is to identify the true plaintexts and the decoy plaintexts without knowing which is which. This is the reason for the name "innocence box"—even if coerced the users can point to a decoy key and claim it to be the right one. Even if the parties point to different keys there is not sure way to tell who is telling the truth.

In the case the decoy plaintexts are markedly less plausible than the true one, then without a proof, the adversary may strongly suspect right. It is therefore the responsibility of the transmitter to choose decoy plaintexts that would keep the adversary guessing. AI technology can be used, as discussed to build (n−1) decoy plaintexts off the true one.

In reality an adversary will discover first some key K' that will decrypt the composite ciphertext to a matching plaintext P'. P' may or may not be any of the n plaintexts in the plaintext group. It may be a different one. If P' will sound plausible, given the circumstances then the adversary will assume it to be the right one, and if it is not, the adversary will wrongly assume they cracked the ciphertext. The adversary may eventually find a second key, K" that decrypts the composite ciphertext to P"' which may also look plausible, and now the adversary is confused between the two. If at the end of the day the adversary discovers r keys and their matching plaintexts, they still don't know if perhaps more keys have been used and one of them points to the true message. The adversary is never sure whether they have the full list of keys that decrypt the composite ciphertext to the right plaintext.

What is claimed is:

1. A cryptographic physical apparatus, "box" constructed to implement a cryptographic operation of combining several plaintext messages into a composite (combined) ciphertext CC, and implementing a reverse, comprising:
   decrypting the CC to the plaintext messages used to prepare it;
   the box offers a physical security option for exercising a novel cryptographic operation in which the several plaintexts messages are combined into a single ciphertext, such that box holders on a receiving end can extract from the combined ciphertext a message that fits to a decryption key they have been using;
   the box is fitted with dedicated ports to engage plaintext, ciphertext and keys;
   the box has no online connectivity, no built-in secret data, fitted with function specified data transmission ports, built to encrypt and decrypt the symmetric composite ciphertext, CC; the CC being a ciphertext that decrypts to different plaintexts, using different keys; the CC is being transmitted over insecure channels from a transmitter to recipients; the recipients decrypt the CC, each recipient according to the keys they hold;
   by encapsulating both the encryption and decryption in an offline box, the transmitters and recipients are protected from online efforts to compromise the keys;
   while the composite ciphertext comes with built-in equivocation since all plaintexts that are extractable from the CC are indistinguishable, as to which plaintext is a correct one and which are decoys;
   the box has four data ports: (i) key entry port, K, (ii) plaintext exchange port, P, (iii) CC exchange port, C, and (iv) randomness port;
   the box is fitted with a man-machine interface screen, MMI, that displays information to its user, and allows the user to communicate with the box;
   the box is battery operated, and fitted with an on/off button;
   the box is used by fitting data storage devices, DSD, into the ports;
   Port P in the box takes in a DSD containing the plaintext that is input into the box;
   Port K in the box takes in a DSD containing the key that is input into the box;
   Port C in the box takes in a DSD containing the CC that is output from the box;
   A DSD containing plaintext $p_i$ is fitted into the box while at the same time a DSD containing the matching key, $k_i$ is fitted into the box, where i=1,2, . . . n, n being an arbitrary count;
   the box encrypts each $p_i$ with its matching $k_i$, then combines the n ciphertexts into the CC;
   the CC is written into a DSD fitted into port C;
   the box is used for decryption by inserting the DSD containing the CC into port C, while inserting into port K the DSD containing $k_i$;

the box takes in the CC from the DSD in port C, and it takes in $k_i$ from the DSD in port K, then computes the matching $p_i$ which is output into the DSD that is inserted into port P.

2. The box in claim 1 where a randomness (random bits) required for encryption is supplied from a built-in algorithm designed to generate pseudo random bits.

3. The box in claim 1 where a randomness (random bits) required for encryption is supplied by a built-in randomness generating apparatus.

4. A cryptographic method where the box of claim 1 is used by a transmitter and a recipient to establish an "innocence option" where by both the transmitter and the recipient, the parties, are holding two shared keys $k_1$ and $k_2$ and are in agreement that $k_1$ will be used to encrypt plaintext $p_1$, a message intended by the transmitter for the recipient, and $k_2$ will be used to encrypt $p_2$, a decoy plaintext, and upon demand to reveal the exchanged message the parties will point to the decoy plaintext $p_2$, claiming to have used $k_2$ for encryption and decryption.

5. A cryptographic method where the box of claim 1 is used by a transmitter to send n different messages $p_1$, $p_2, \ldots p_n$ to n recipients $r_1, r_2, \ldots r_n$ respectively by sharing a key $k_i$ with recipient $r_i$, and whereby the combined ciphertext, CC will be decrypted by each recipient i to the message $p_i$ intended for them, i=1,2, . . . n.

* * * * *